United States Patent
Hamade

(10) Patent No.: US 10,570,291 B2
(45) Date of Patent: Feb. 25, 2020

(54) METHOD FOR MANUFACTURING COATING MATERIAL

(71) Applicant: CANON KABUSHIKI KAISHA, Tokyo (JP)

(72) Inventor: Yohei Hamade, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 15/785,113

(22) Filed: Oct. 16, 2017

(65) Prior Publication Data

US 2018/0112082 A1 Apr. 26, 2018

(30) Foreign Application Priority Data

Oct. 20, 2016 (JP) .................. 2016-206131

(51) Int. Cl.
 *C09D 183/08* (2006.01)
 *C09D 5/16* (2006.01)

(52) U.S. Cl.
 CPC .................. *C09D 5/1625* (2013.01)

(58) Field of Classification Search
 None
 See application file for complete search history.

(56) References Cited

U.S. PATENT DOCUMENTS

| | | | | |
|---|---|---|---|---|
| 2,892,859 A * | 6/1959 | McBee | ................ | C07F 7/1804 556/485 |
| 2,993,925 A * | 7/1961 | Husted | ................ | C07F 7/025 156/315 |
| 3,491,134 A * | 1/1970 | Holder | ................ | C07F 7/045 252/78.3 |
| 4,652,663 A * | 3/1987 | Takago | ................ | C07F 7/1804 549/215 |
| 4,904,504 A * | 2/1990 | Isozaki | ................ | C09D 5/1675 427/387 |
| 5,798,430 A * | 8/1998 | Michalczyk | ............... | C07F 7/21 528/42 |
| 6,075,110 A * | 6/2000 | Mohri | .................. | C09D 5/1637 528/14 |
| 6,558,804 B2 * | 5/2003 | Sato | ....................... | C08G 77/24 106/287.14 |
| 6,706,906 B2 * | 3/2004 | Yoneda | .................... | C03C 17/30 524/858 |
| 7,294,731 B1 * | 11/2007 | Flynn | .................... | C07F 7/1804 556/427 |
| 7,914,809 B2 * | 3/2011 | Atanasoska | ............. | A61L 29/08 424/423 |
| 9,175,177 B2 * | 11/2015 | Nagato | .................... | C09D 7/63 |

(Continued)

FOREIGN PATENT DOCUMENTS

JP 2013-237259 A 11/2013

OTHER PUBLICATIONS

Zhang et al. "A programmable microenvironment for cellular studies via microfluidics-generated double emulsions" Biomaterials, 2013, 34, 4564-4572. (Year: 2013).*

*Primary Examiner* — Robert S Loewe
(74) *Attorney, Agent, or Firm* — Canon U.S.A. Inc., IP Division

(57) ABSTRACT

A method for manufacturing a coating material containing a condensate of a hydrolytic silane compound includes a process of obtaining a condensate of a fluorine-containing hydrolytic silane compound and a process of causing the condensate to react with fluoroalcohol.

17 Claims, 2 Drawing Sheets

(56) References Cited

U.S. PATENT DOCUMENTS

| | | | | |
|---|---|---|---|---|
| 2001/0056166 | A1* | 12/2001 | Mohri | C09D 5/00 |
| | | | | 528/9 |
| 2004/0253462 | A1* | 12/2004 | Narita | C08L 83/04 |
| | | | | 428/447 |
| 2006/0153993 | A1* | 7/2006 | Schmidt | B05D 3/0209 |
| | | | | 427/470 |
| 2008/0027203 | A1* | 1/2008 | Dams | C08G 18/2885 |
| | | | | 528/42 |
| 2013/0178580 | A1* | 7/2013 | Takata | C09D 5/1675 |
| | | | | 524/588 |
| 2013/0216958 | A1* | 8/2013 | Tsutsui | G03F 7/11 |
| | | | | 430/325 |
| 2014/0272725 | A1* | 9/2014 | Hamade | G03F 7/16 |
| | | | | 430/325 |
| 2014/0309329 | A1* | 10/2014 | Sawada | C09D 5/1675 |
| | | | | 523/122 |
| 2016/0316804 | A1* | 11/2016 | Edmiston | A23L 27/72 |
| 2018/0112082 | A1* | 4/2018 | Hamade | C09D 5/1625 |

* cited by examiner

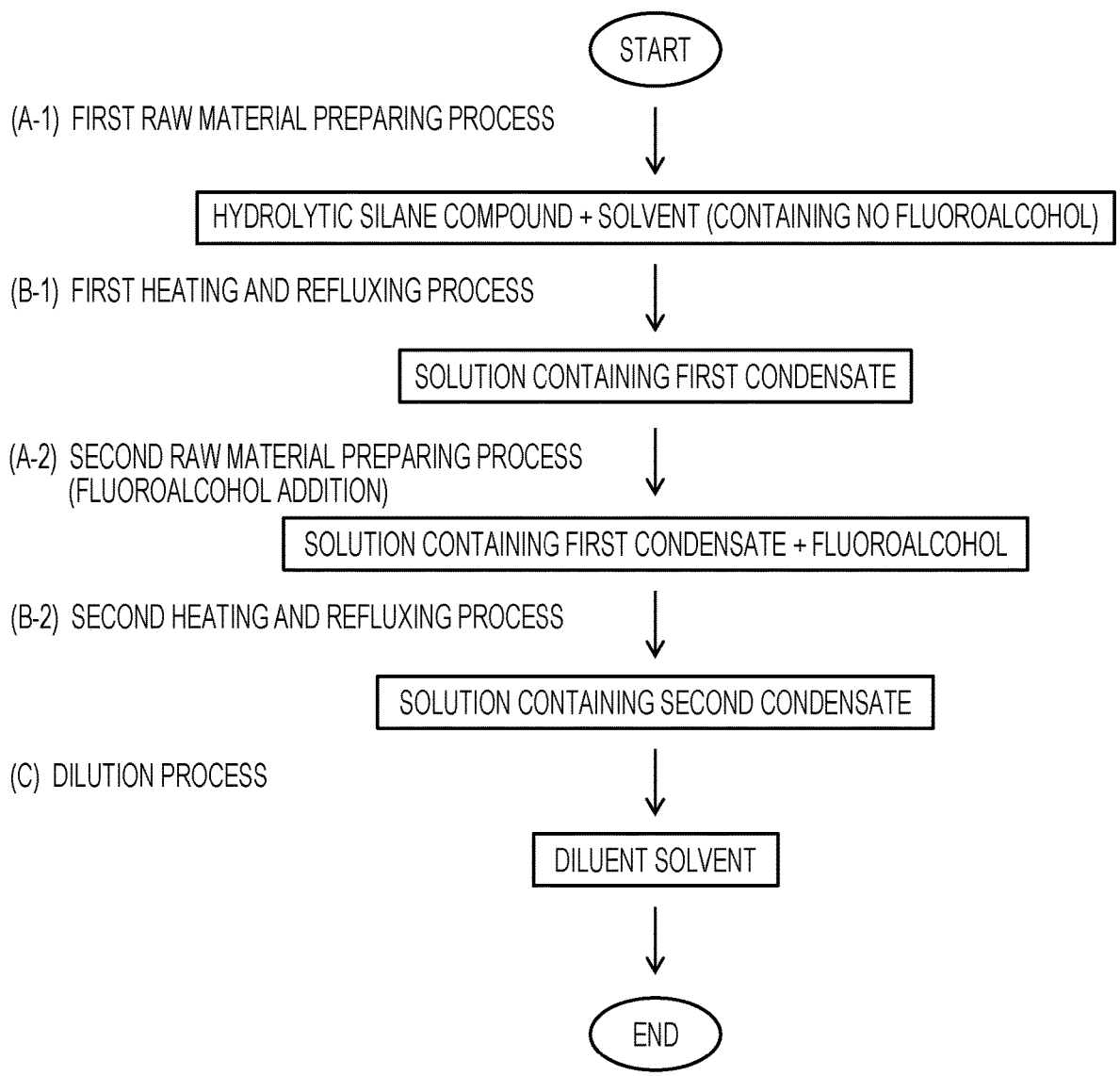

METHOD FOR MANUFACTURING COATING MATERIAL

BACKGROUND OF THE INVENTION

Field of the Invention

The present disclosure relates to a method for manufacturing a coating material.

Description of the Related Art

A fluorine-containing compound generally has low surface free energy, and therefore has characteristics, such as water- and oil-repellency, repelling property, and antifouling properties. Utilizing the characteristics, the fluorine-containing compound has been widely utilized industrially for water- and oil-repellent antifouling agents for paper and fibers, water- and oil-repellent antifouling agents for the display surface, oilproof agents for precision instruments, and the like. As general-purpose articles containing the fluorine-containing compound, fluorine-containing hydrolytic silane coupling agents are known. The silane coupling agents can be used alone or can be used by adding another silane coupling agent, followed by condensing, in order to give film formability and strength in application, photosensitivity, and the like.

However, when the condensation excessively progresses, problems, such as precipitation and a viscosity increase of a condensate, arise. In particular, in a condensate containing a fluorine-containing silane coupling agent, a condensation degree increase causes a water repellency developing property reduction. This is because the degree of freedom in terms of structure decreases due to the condensation, and fluorine-containing groups are less likely to cause surface orientation. Moreover, also in a condensate containing the hydrolytic silane coupling agent, the condensation of unreacted groups in the condensate progresses with progress of time, so that the same problems as the problems described above arise.

In order to prevent the condensation with progress of time, Japanese Patent Laid-Open No. 2013-237259 discloses a method for preventing unnecessary hydrolysis causing the condensation by achieving moisture proof using a fluorine-based solvent, such as hydrofluoroether.

SUMMARY OF THE INVENTION

The present disclosure is directed to providing a method for manufacturing a coating material excellent in storage stability.

The present disclosure is directed to a method for manufacturing a coating material containing a condensate of a hydrolytic silane compound, the method which includes a process of obtaining a condensate of a fluorine-containing hydrolytic silane compound and a process of causing the condensate to react with fluoroalcohol.

Further features of the present disclosure will become apparent from the following description of exemplary embodiments with reference to the attached drawings.

BRIEF DESCRIPTION OF THE DRAWINGS

FIG. 2 is a flowchart illustrating a manufacturing flow of a coating material according to a second embodiment.

DESCRIPTION OF THE EMBODIMENTS

Figure 1:
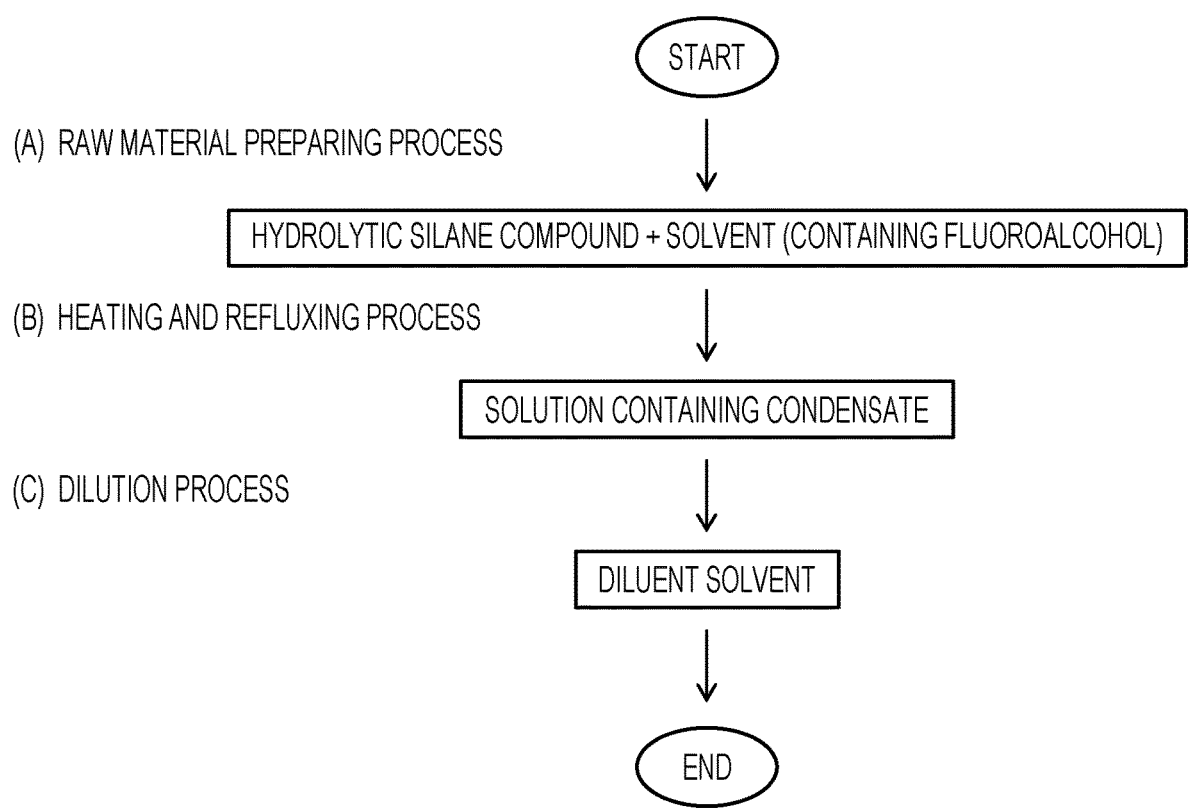
FIG. 1 is a flowchart illustrating a manufacturing flow of a coating material according to a first embodiment.

According to an examination of the present inventors, under specific use environments, such as a long distance transportation from a manufacturing place to a use place, storage in mass production, or the like of the material, the storage stability to be obtained by the method described in Japanese Patent Laid-Open No. 2013-237259 above cannot be said to be sufficient and more excellent storage stability is required in some cases. In particular, with the method described in Japanese Patent Laid-Open No. 2013-237259, when storage under environments other than refrigeration and freezing is required, it may be difficult to maintain the storage stability of the material.

According to the present disclosure, the generated condensate of the hydrolytic silane compound can be prevented from condensation with progress of time and can maintain high water repellency even in the long distance transportation and the storage in mass production of the material. Therefore, a coating material excellent in storage stability and a method for manufacturing the same can be provided.

The coating material of the present invention can be used for giving a water-repellent antifouling property to an object, for example. Hereinafter, a description is given taking a water repellent antifouling coating material as an example of the coating material. The coating material according to the present invention is a coating material containing a condensate of a hydrolytic silane compound (hereinafter also referred to as "silane condensate" or "condensate"), and the condensate of the hydrolytic silane compound is a reaction condensate of a composition containing a fluorine-containing hydrolytic silane compound and fluoroalcohol.

A method for manufacturing a coating material according to the present disclosure is a method for manufacturing a coating material containing a condensate of a hydrolytic silane compound and includes a process of heating and refluxing the hydrolytic silane compound in a solution containing fluoroalcohol to obtain a solution containing the condensate, in which a fluorine-containing hydrolytic silane compound is used as the hydrolytic silane compound.

In the coating material according to the present disclosure, reactive groups (hydrolytic group) which are not hydrolyzed in a silane condensate are partially substituted by fluoroalkoxy groups which are hard to hydrolyze. Therefore, it becomes possible to prevent the hydrolysis and the condensation with progress of time. Herein, as a general method for substituting the hydrolytic group in the silane condensate by a fluoroalkoxy group, a method for performing a substitution reaction before a heating and refluxing process of obtaining a condensate is mentioned. However, with this method, hydrolysis following the substitution reaction is prevented by the high stability of the fluoroalkoxy group, and thus a desired silane condensate is not obtained in some cases. Therefore, a method for performing the substitution reaction to a fluoroalkoxy group in the heating and refluxing for obtaining the silane condensate or after obtaining the silane condensate beforehand is suitable.

In general, the reaction speed of the condensation of the silane coupling agent is the lowest in a weak acidic region. The fluoroalcohol to be used in the present invention has higher acidity as compared with organic alcohol, and therefore the condensation of a hydrolyzed group can be more effectively prevented.

On the other hand, when a fluorine-based solvent other than the fluoroalcohol is used, a storage stability effect (hydrolysis prevention effect) by avoiding moisture is obtained but there is no effect of preventing the condensation of a hydrolyzed group, and thus the same effects as those of the present invention are not obtained. Moreover, in order to prevent the condensation, a method including adding acid to a coating material to adjust the pH is also known but, with this method, the effect of preventing the hydrolysis is not obtained.

In the present disclosure, the hydrolysis of the hydrolytic group in the silane condensate to be obtained can be prevented and the condensation of the hydrolyzed group can be prevented by the use of the fluorine-containing hydrolytic silane compound and fluoroalcohol.

Hereinafter, an embodiment of the present disclosure is described in detail with reference to the drawings.

First Embodiment (Reference Embodiment)

As illustrated in FIG. 1, a method for manufacturing a coating material according to a first embodiment of the present disclosure has the following processes:
(A) Raw material preparing process of mixing a hydrolytic silane compound and a solvent containing fluoroalcohol which are raw materials of the coating material; and
(B) Heating and refluxing process of heating and refluxing the mixture obtained in the process (A) to obtain a condensate-containing solution.

In this embodiment, a substitution reaction to a fluoroalkoxy group of a hydrolytic group in a fluorine-containing hydrolytic silane compound and condensation of the fluorine-containing hydrolytic silane compound mainly progress in the process (B). More specifically, in this embodiment, the substitution reaction to a fluoroalkoxy group is performed in the heating and refluxing of obtaining the condensate. Since the condensation of the fluorine-containing hydrolytic silane compound becomes slow in a weak acidic region as described above, priority is given to the substitution reaction to the fluoroalkoxy group in this embodiment.

Second Embodiment

As illustrated in FIG. 2, a method for manufacturing a coating material according to a second embodiment of the present disclosure has the following processes:
(A-1) First raw material preparing process of mixing a hydrolytic silane compound and a solvent not containing fluoroalcohol which are raw materials of the coating material;
(B-1) First heating and refluxing process of heating and refluxing the mixture obtained in the process (A-1) to obtain a solution containing a first condensate;
(A-2) Second raw material preparing process of adding fluoroalcohol to the solution containing the first condensate obtained in the process (B-1); and
(B-2) Second heating and refluxing process of heating and refluxing the mixture obtained in the process (A-2) to obtain a solution containing a second condensate.

In this embodiment, the condensation of a fluorine-containing hydrolytic silane compound progresses to give the first condensate mainly in the process (B-1). Then, mainly in the process (B-2), the substitution reaction to the fluoroalkoxy group of the hydrolytic group in the first condensate progresses. More specifically, in this embodiment, a silane condensate is obtained beforehand, and then the substitution reaction to a fluoroalkoxy group is performed.

As described above, the coating material according to the present disclosure contains a condensate of a reactant of a fluorine-containing hydrolytic silane compound and fluoroalcohol and/or a reaction condensate containing a reactant of a condensate of a fluorine-containing hydrolytic silane compound and fluoroalcohol. Hereinafter, each process is described in detail.

1. Raw Material Preparing Process

First Embodiment (A) Raw Material Preparing Process

In the raw material preparing process, a hydrolytic silane compound and a solvent containing fluoroalcohol which are raw materials of a coating material are mixed to obtain a mixture. The mixture is a composition containing a fluorine-containing hydrolytic silane compound and fluoroalcohol.

Hydrolytic Silane Compound

Fluorine-Containing Hydrolytic Silane Compound

In the present disclosure, the fluorine-containing hydrolytic silane compound is used as the hydrolytic silane compound. In the coating material according to the present disclosure, the fluorine-containing hydrolytic silane compound has a water repellent antifouling function. The fluorine-containing hydrolytic silane compound is suitably a hydrolytic silane compound having a fluorine-containing group selected from the group consisting of a perfluoro alkyl group, a perfluoro aryl group, and a perfluoro polyether group from the viewpoint of water repellency and flexibility. The hydrolytic silane compound is suitably a silane compound having an alkoxy group as a hydrolytic group.

First, the hydrolytic silane compound having a perfluoro alkyl group or a perfluoro aryl group is described.

The hydrolytic silane compound having a perfluoro alkyl group or a perfluoro aryl group is suitably a compound represented by the following formula (1) from the viewpoint of solubility and water repellency in a heating and refluxing process described later.

$$(R_f)_a\text{—Si}(R)_bX_{(4-a-b)} \quad (1)$$

In Formula (1), $R_f$ represents an alkyl group having 1 or more fluorine atoms or an aryl group having 1 or more fluorine atoms, R represents a non-hydrolytic substituent, and X represents a hydrolytic substituent. a is 1 or 2, b is an integer of 0 to 2, and a+b is an integer of 1 to 3. b is suitably 0 or 1 and more suitably 0.

In Formula (1), $R_f$ is suitably an alkyl group having 1 to 30 fluorine atoms or an aryl group having 1 to 30 fluorine atoms and more suitably an alkyl group having 9 to 21 fluorine atoms or an aryl group having 9 to 21 fluorine atoms. When the number of the fluorine atoms is 1 or more, the coating material to be obtained demonstrates sufficient water repellency. When the number of the fluorine atoms is 30 or less, aggregation of a silane compound is prevented, and a solubility reduction in a solvent can be prevented.

Specific examples of $R_f$ include groups in which some or all of the hydrogen atoms of alkyl groups having 1 to 12 carbon atoms, such as a methyl group, an ethyl group, an n-propyl group, an isopropyl group, an n-butyl group, a sec-butyl group, an isobutyl group, a tert-butyl group, an n-hexyl group, an n-octyl group, and a dodecyl group, and aryl groups, such as a phenyl group and a naphthyl group, are substituted by fluorine atoms. Among the above, $R_f$ is suitably a trifluoromethyl group, a 3,3,3-trifluoropropyl group, a perfluoro butyl group, a perfluoro-1,1,2,2-tetrahydrooctyl group, a perfluoro-1,1,2,2-tetrahydro dodecyl group, or a pentafluorophenyl group from the point of ease of availability as commercially-available items.

Examples of the non-hydrolytic substituent represented by R in Formula (1) include alkyl groups, such as a methyl group, an ethyl group, and a propyl group; aryl groups, such as a phenyl group and a naphthyl group; groups in which some or all of the hydrogen atoms bonded to carbon atoms of the groups are substituted by halogen atoms, such as a fluorine atom, and the like.

Examples of the hydrolytic substituent represented by X in Formula (1) include alkoxy groups, such as a hydrogen atom, a halogen atom, a methoxy group, an ethoxy group, and a propoxy group, an acyloxy group, a ketoxymatee group, an amino group, an aminooxy group, an amideoxy group, an amide group, an acid amide group, and the like. Among the above, the alkoxy groups are suitable from the point of ease of occurrence of substitution to a fluoroalkoxy group. This is because, when X is a group which easily causes hydrolysis as with a halogen atom, a silanol group generated by hydrolysis is stabilized, and the substitution to a fluoroalkoxy group is hard to occur.

Specific examples of the compound represented by Formula (1) above include 3,3,3-trifluoropropyl trimethoxy silane, nonafluoro-1,1,2,2-tetrahydrohexyltriethoxysilane, tridecafluoro-1,1,2,2-tetrahydrooctyltriethoxysilane, perfluoro-1,1,2,2-tetrahydrododecyltriethoxysilane, pentafluorophenyltriethoxysilane, and the like. These compounds may be used alone or in combination of two or more kinds thereof.

Next, a hydrolytic silane compound having a perfluoro polyether group is described.

The perfluoro polyether group is a group in which one or more units containing a perfluoro alkyl group and an oxygen atom (ether bond) are connected. From the viewpoint of water repellency and flexibility, the perfluoro polyether group is suitably a group represented by the following formula (2). In the following formula (2), the structure represented in the brackets is each unit. In this specification, the number represented by o, p, q, and r representing the number of each unit is referred to as the number of repeating units.

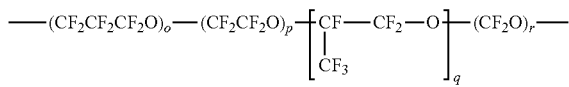

(2)

In Formula (2), o, p, q, and r each independently represent an integer of 0 to 30 and at least one of o, p, q, and r is an integer of 2 or more. o, p, q, and r each independently represent an integer of 1 to 30. The total of o, p, q, and r is suitably an integer of 3 to 10 from the viewpoint of solubility in a solvent and water repellency.

The hydrolytic silane compound having a perfluoro polyether group is suitably at least one of the compounds represented by the following formulae (3) to (6) from the viewpoint of flexibility and simplicity.

(3)

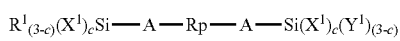

(4)

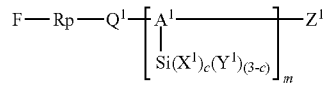

(5)

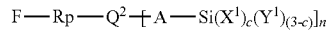

(6)

In Formulae (3) to (6), Rp represents a perfluoro polyether group, A and $A^1$, each independently represent an organic group having 1 to 12 carbon atoms, $X^1$ represents a hydrolytic substituent, $Y^1$ and $R^1$ each independently represent a non-hydrolytic substituent, $Z^1$ represents a hydrogen atom or an alkyl group, and $Q^1$ represents a divalent linking group. c is an integer of 1 to 3, m is an integer of 1 to 4, n is 1 or 2, and $Q^2$ represents a divalent linking group in the case of n=1 and represents a trivalent linking group in the case of n=2.

Rp in Formulae (3) to (6) above is suitably the perfluoro polyether group represented by Formula (2) above. In that case, the number of repeating units o, p, q, and r in Formula (2) each independently represent an integer of 1 to 30. Depending on the structure of the perfluoro polyether group, it is more suitable that the number of repeating units o, p, q, and r each independently represent an integer of 3 to 20. The compound having the perfluoro polyether group may be a mixture of a plurality of compounds different in the number of repeating units.

When Rp in Formulae (3) to (6) above is the perfluoro polyether group represented by Formula (2) above, the average molecular weight of the Rp is suitably 500 to 5000 and more suitably 500 to 2000. Due to the fact that the average molecular weight of Rp is 500 or more, the coating material to be obtained can demonstrate sufficient water repellency. Due to the fact that the average molecular weight of Rp is 5000 or less, sufficient solubility in a solvent is obtained. The average molecular weight of Rp (perfluoro polyether group) means the average of the total molecular weights of the units represented by the repeating units in Formula (2) above. The average molecular weight is a value measured by GPC (gel permeation chromatography).

Examples of the hydrolytic substituent represented by $X^1$ in Formulae (3) to (6) include alkoxy groups, such as a hydrogen atom, a halogen atom, a methoxy group, an ethoxy group, and a propoxy group, amino groups, and the like, for example. Among the above, the alkoxy groups are suitable from the point that a group disconnected by the hydrolysis does not inhibit a cationic polymerization reaction, and the reactivity is easily controlled and the point of ease of occurrence of the substitution to a fluoroalkoxy group.

Examples of the non-hydrolytic substituents represented by $Y^1$ and $R^1$ in Formulae (3) to (6) include alkyl groups having 1 to 20 carbon atoms, such as a methyl group, an ethyl group, and a propyl group, and aryl groups, such as a phenyl group and a naphthyl group.

Examples of the organic groups represented by A in Formulae (3), (4), and (6) include alkylene groups having 1 to 12 carbon atoms, such as a methylene group, an ethylene group, and a propylene group, and the like. The alkylene group may be a structure in which some carbon atoms in a carbon chain are substituted by oxygen atoms as represented in the following formulae (8) and (9). The alkylene group may be an alkylene group having a substituent. As the substituent, a fluorine atom and the like are mentioned.

Examples of the organic group represented by $A^1$ in Formula (5) include trivalent hydrocarbon groups, such as a methine group. Examples of the alkyl group represented by $Z^1$ include a methyl group, an ethyl group, a propyl group, and the like. Examples of $Q^1$ and $Q^2$ include a carbon atom, a nitrogen atom, a linking group containing at least one selected from the group consisting of a carbon atom, a nitrogen atom, and an oxygen atom, and the like. The carbon atom or the nitrogen atom in the linking group may be substituted by alkyl groups, such as a fluorine atom and a methyl group. Examples of the linking group containing at least one selected from the group consisting of a carbon atom, a nitrogen atom, and an oxygen atom include an alkylene group, a carbonyl group (—C(=O)—), an amide group (—C(=O)—N—), and the like, for example. Moreover, a structure in which two or more of the linking groups are combined may be acceptable.

Suitable specific examples of the hydrolytic silane compound having a perfluoro polyether group represented by Formulae (3) to (6) above include compounds represented by the following formulae (7) to (11). The compounds may be used alone or in combination of two or more kinds thereof.

the purpose of performing water-repellent treatment to a minute region. More specifically, it is suitable that the condensate of the hydrolytic silane compound described above is a reaction condensate of a composition containing the fluorine-containing hydrolytic silane compound, the photosensitive group-containing hydrolytic silane compound, and fluoroalcohol.

The photosensitive group-containing hydrolytic silane compound is suitably an epoxy group-containing hydrolytic silane compound from the viewpoint of high adhesiveness with a base of a coating film formed using the coating material of the present disclosure. The epoxy group-containing hydrolytic silane compound is suitably a compound represented by the following formula (12) from the viewpoint of flexibility.

$$R_c\text{—}Si(R^2)_d X^2_{(3-d)} \tag{12}$$

In Formula (12), $R_C$ represents a non-hydrolytic substituent having an epoxy group, $R^2$ represents a non-hydrolytic substituent, and $X^2$ represents a hydrolytic substituent. d is an integer of 0 to 2. d is suitably 0 or 1 and more suitably 0.

(7)

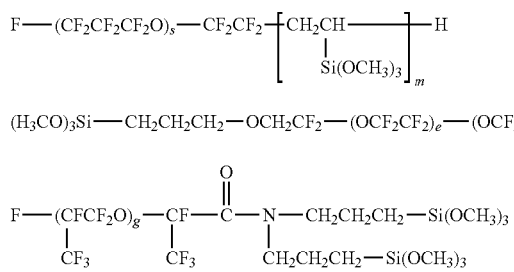

(9)

In Formulae (7) to (11), s, t, e, f, g, and h each independently represent an integer of 1 to 30 and m is an integer of 1 to 4. In Formula (11), $R_m$ represents a hydrogen atom or a methyl group.

In Formulae (7) to (11), s, t, e, f, g, and h which are the number of repeating units of the perfluoro polyether group each independently represent an integer of 3 to 30 and more suitably an integer of 5 to 20. When the number of repeating units is 3 or more, the water repellency of a coating material improves. When the number of repeating units is 30 or less, the solubility in a solvent improves. In particular, it is suitable that, when the condensation is performed in a solution containing a non-fluorine-based polar solvent, such as alcohol, described later, in addition to the fluoroalcohol as the solvent, s, t, e, f, g, and h each independently represent an integer of 3 to 10.

Examples of commercially-available hydrolytic silane compounds having a perfluoro polyether group include Optool (Registered Trademark) DSX" and "Optool AES" manufactured by Daikin Industries, LTD.; "KY-108" and "KY-164" manufactured by Shin-Etsu Chemical Co., Ltd., "Novec (Registered Trademark) 1720" manufactured by 3M; "Fluololink (Registered Trademark) S10" manufactured by Solvay Solexis Inc., (all Trade names), and the like. These items may be used alone or in combination of two or more kinds thereof. Photosensitive group-containing hydrolytic silane compound As the hydrolytic silane compound, in addition to the fluorine-containing hydrolytic silane compound described above, a photosensitive group-containing hydrolytic silane compound adding photopatternability is suitably usable for Examples of $R_C$ in Formula (12) include a glycidoxypropyl group, an epoxycyclohexylethyl group, and the like. Examples of $R^2$ include alkyl groups, such as a methyl group and an ethyl group, and aryl groups, such as a phenyl group and a naphthyl group.

Examples of $X^2$ include alkoxy groups, such as a hydrogen atom, a halogen atom, a methoxy group, an ethoxy group, and a propoxy group, amino groups, and the like. Among the above, the alkoxy groups are suitable from the point that a group disconnected by the hydrolysis does not inhibit a cationic polymerization reaction, and the reactivity is easily controlled and the point of ease of occurrence of the substitution to a fluoroalkoxy group.

In Formula (12) above, specific examples of the compounds in which $X^2$ is an alkoxy group include glycidoxypropyltrimethoxysilane, glycidoxypropyltriethoxysilane, epoxycyclohexylethyltrimethoxysilane, epoxycyclohexylethyltriethoxysilane, glycidoxypropylmethyldimethoxysilane, glycidoxypropylmethyldiethoxysilane, glycidoxypropyldimethylmethoxysilane, glycidoxypropyldimethylethoxysilane, and the like. These compounds may be used alone or in combination of two or more kinds thereof.

Optical patterning may be performed by adding a photopolymerization initiator to the coating material. As the photopolymerization initiator, a photocationic polymerization initiator (photoacid generator) for curing the epoxy group-containing hydrolytic silane compound is suitably used. Examples of the photoacid generator include aromatic iodonium salt compounds, aromatic sulfonium salt compounds, and the like. Specifically, examples of commercially-available items thereof include "ADEKA OPTOMER SP-170", "ADEKA OPTOMER SP-172", and "ADEKA OPTOMER SP-150" manufactured by ADEKA Co., Ltd.; "BBI-103" and "BBI-102" (Trade names) manufactured by Midori Kagaku Co., Ltd.; "IBPF", "IBCF", "TS-01", and "TS-91" manufactured by Sanwa Chemical Co., Ltd. (all Trade names), and the like. The items may be used alone or in combination of two or more kinds thereof. When a base of a coating film formed using the coating material according to the present disclosure contains a photoacid generator, the acid diffuses from the base, and therefore the coating film can be cured even when no photoacid generator is added.

When using the photoacid generator, it is suitable to add the photoacid generator so that the solid content concentration of the photoacid generator is 0.1 to 10% by mass to the epoxy group-containing hydrolytic silane compound. The photoacid generator may be added in the heating and refluxing process or may be added in a dilution process described later.

Hydrolytic Silane Compound Having Alkyl Group or Aryl Group

Further, it is suitable to use a hydrolytic silane compound having an alkyl group or an aryl group as the hydrolytic silane compound in addition to the fluorine-containing hydrolytic silane compound and the epoxy group-containing hydrolytic silane compound for the purpose of improving durability, preventing aggregation of the silane compound, and the like. More specifically, the condensate of the hydrolytic silane compound is suitably a reaction condensate of a composition containing the fluorine-containing hydrolytic silane compound, the photosensitive group-containing hydrolytic silane compound, the hydrolytic silane compound having an alkyl group or an aryl group, and fluoroalcohol. The hydrolytic silane compound having an alkyl group or an aryl group is suitably a compound represented by the following formula (13) from the viewpoint of flexibility or water repellency developing property.

$(R_d)_i\text{—}SiX^3_{(4-i)}$ (13)

In Formula (13), $R_d$ represents an alkyl group or an aryl group and $X^3$ represents a hydrolytic substituent. i is an integer of 1 to 3. Two or more of $R_d$s present when i is 2 or 3 may be the same or different from each other.

Examples of $R_d$ include alkyl groups having 1 to 12 carbon atoms, such as a methyl group, an ethyl group, a propyl group, a butyl group, and a hexyl group, and aryl groups, such as a phenyl group and a naphthyl group. Among the above, $R_d$ is suitably at least one of a methyl group and a phenyl group from the viewpoint of water repellency.

Examples of $X^3$ include alkoxy groups, such as a hydrogen atom, a halogen atom, a methoxy group, an ethoxy group, and a propoxy group, an acyloxy group, a ketoxymate group, an amino group, an aminooxy group, an amideoxy group, an amide group, an acid amide group, and the like. Among the above, the alkoxy groups are suitable from the point that a group disconnected by the hydrolysis does not inhibit a cationic polymerization reaction, and the reactivity is easily controlled and the point of ease of occurrence of the substitution to a fluoroalkoxy group.

Specific examples of the compound represented by Formula (13) include methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, dimethyldimethoxysilane, dimethyldiethoxysilane, phenyltrimethoxysilane, phenyltriethoxysilane, trimethylmethoxysilane, trimethylethoxysilane, and the like. These compounds may be used alone or in combination of two or more kinds thereof.

The polarity or the crosslink density of a condensate becomes controllable by the use of the hydrolytic silane compound having an alkyl group or an aryl group represented by Formula (13) in combination with the fluorine-containing hydrolytic silane compound and the photosensitive group-containing hydrolytic silane compound. When such a non-cationic polymerizable silane compound is used in combination, the degree of freedom of a substituent increases and the orientation to the side of the air interface of a fluorine-containing group and the like are promoted. Due to the presence of a nonpolar group, such as an alkyl group, cleavage of a siloxane bond is prevented and the water repellency and the durability of a coating material improve.

The compounding ratio and the solid content concentration in a solution of each hydrolytic silane compound described above are determined as appropriate according to the use mode, raw materials, and a solvent. However, the concentration of the solid content containing the hydrolytic silane compound in the solution obtained in the raw material preparing process, i.e., the concentration of the solid content containing the hydrolytic silane compound before heating and refluxing in the solution containing fluoroalcohol, is suitably 5 to 50% by mass. When the concentration of the solid content is 5% by mass or more, the condensation sufficiently progresses. When the concentration of the solid content is 50% by mass or less, a possibility that the solid content aggregates to precipitate decreases. In the second embodiment described later, the concentration means the concentration of the solid content containing the hydrolytic silane compound in a solution obtained in a second raw material preparing process.

The compounding ratio (molar ratio) of the fluorine-containing hydrolytic silane compound in the hydrolytic silane compound used in the raw material preparing process is suitably 0.1% or more and more suitably 0.5% or more in consideration of the fluorine-containing hydrolytic silane compound in a coating liquid described later.

Solvent

Fluoroalcohol

A solvent in the raw material preparing process (A) contains fluoroalcohol. The fluoroalcohol contributes to the storage stability with progress of time in the coating material according to the present disclosure as described above. The fluoroalcohol is not particularly limited and is suitably a compound represented by each of the following formulae (14) to (16) from the viewpoint of flexibility.

$(R_{f1})_j\text{—}(R^3)_k\text{—}OH$ (14)

$HO\text{—}(R_{f1})_j\text{—}(R^3)_k\text{—}OH$ (15)

$((R_{f1})_j\text{—}O)_l\text{—}(R^3)_k\text{—}OH$ (16)

In Formulae (14) to (16), $R_{f1}$ represents a fluoroalkyl group or a perfluoroaryl group having 3 or more fluorine atoms and $R^3$ represents a non-hydrolytic substituent. j is 1 or 2, k is an integer of 0 to 2, l is 1 or 2, and j+k is an integer of 1 to 3.

In Formulae (14) to (16), $R_{f1}$ is suitably a fluoroalkyl group having 5 or more fluorine atoms. When the number of fluorine atoms of $R_{f1}$ is 5 or more, the pH control to a weak acidic region of a solution is facilitated. Moreover, a solubility reduction of the fluorine-containing hydrolytic silane compound in the heating and refluxing process described later can be prevented.

$R_{f1}$ is suitably a fluoroalkyl group having 2 to 8 carbon atoms and more suitably a fluoroalkyl group having 3 to 6 carbon atoms. When the number of carbon atoms is 2 or more, an effect of preventing hydrolysis is sufficiently obtained. When the number of carbon atoms is 8 or less, it can be prevented that the substitution reaction to the fluoroalkoxy group of the hydrolytic group remaining in a silane condensate becomes hard to occur due to steric hindrance.

Specific examples of $R_{f1}$ include groups in which some or all of the hydrogen atoms of alkyl groups having 1 to 8 carbon atoms, such as a methyl group, an ethyl group, an n-propyl group, an isopropyl group, an n-butyl group, a sec-butyl group, an isobutyl group, and a tert-butyl group, are substituted by fluorine atoms, a perfluorophenyl group, and a perfluoronaphthyl group. Among the above, $R_{f1}$ is suitably a perfluoroethyl group, a heptafluorobutyl group, and a perfluorohexyl group from the point of ease of availability as commercially-available items.

Examples of the non-hydrolytic substituent represented by $R^3$ in Formulae (14) to (16) include alkylene groups having 1 to 12 carbon atoms, such as a methylene group, an ethylene group, a propylene group, a butylene group, and a hexylene group, arylene groups, such as a phenylene group, and the like. These alkylene groups and arylene groups may have substituents, such as a fluorine atom and a trifluoromethyl group.

Specific examples of the compounds represented by Formulae (14) to (16) above include trifluoromethanol, 1H,1H-trifluoroethanol, 1H,1H-pentafluoropropanol, 6-(perfluoroethyl)hexanol, 1H,1H-heptafluorobutanol, 2-(perfluorobutyl)ethanol, 3-(perfluorobutyl)propanol, 6-(perfluorobutyl)hexanol, 2-perfluoropropoxy-2,3,3,3-tetrafluoropropanol, 2-(perfluorohexyl)ethanol, 3-(perfluorohexyl)propanol, 6-(perfluorohexyl)hexanol, 6-(perfluoromethyl)hexanol, 1H,1H,3H-tetrafluoropropanol, 2H-hexafluoro-2-propanol, 1H,1H,3H-hexafluorobutanol, 2,2,3,3,4,4,5,5-octafluoro-1,6-hexanediol, 2,2,3,3,4,4,5,5,6,6,7,7-dodecafluoro-1,8-octanediol, 2,2-bis(trifluoromethyl)propanol, and the like. Two or more kinds of these fluoroalcohols may be used in combination in order to improve both the solubility and the condensation prevention effect of the fluorine-containing hydrolytic silane compound.

Other Solvents

In the present disclosure, in order to promote the hydrolysis and the condensation of the hydrolytic silane compound, water is used in addition to fluoroalcohol as the other solvents.

As the other solvents, in addition to fluoroalcohol and water, solvents other than fluoroalcohol and water may be mixed from the viewpoint of the coatability in the coating film formation, the solubility of the silane compound, and the like. As the solvents other than fluoroalcohol and water, a fluorine-based solvent with a low surface tension is suitable from the point of improving the coatability of the coating material. Specifically, hydrofluorocarbon, perfluorocarbon, hydrofluoroether, perfluoropolyether, and the like are mentioned.

When adding a silane compound with high polarity, non-fluorine-based polar solvents having a hydroxyl group, a carbonyl group, and an oxygen atom of an ether bond or the like, are suitably used in order to increase the solubility. Specific examples thereof include non-fluorine-based polar solvents, such as alcohols, such as methanol, ethanol, a propanol, isopropanol, and butanol; ketones, such as methyl ethyl ketone and methyl isobutyl ketone; esters, such as ethyl acetate and butyl acetate; ethers, such as diglyme and tetrahydrofuran; and glycols, such as diethylene glycol.

When the other solvents are mixed, the content of the fluoroalcohols in all the solvents of the solution to be obtained in the raw material preparing process is suitably 30% by mass or more. When the content of the fluoroalcohol is 30% by mass or more, the hydrolytic group remaining as an unreacted group in the silane condensate is sufficiently substituted by a fluoroalkoxy group, so that more excellent storage stability is obtained. In the second embodiment described later, the content of the fluoroalcohols in all the solvents of the solution to be obtained in the second raw material preparing process is suitably within the range mentioned above.

Second Embodiment (A-1) First Raw Material Preparing Process

In the first raw material preparing process, a hydrolytic silane compound and a solvent not containing fluoroalcohol are mixed to obtain a first mixture. As the hydrolytic silane compound, the same substances as those mentioned as examples relating to the raw material preparing process (A) are usable. As the solvent not containing fluoroalcohol, those described in the section of "Other solvents" of the raw material preparing process (A) are usable.

(A-2) Second Raw Material Preparing Process

In the second raw material preparing process, fluoroalcohol is added to a solution containing the first condensate to be obtained in the first heating and refluxing process described later to obtain a second mixture. The second mixture is a composition containing a fluorine-containing hydrolytic silane compound and fluoroalcohol. As the fluoroalcohol, the same substances described in the section "Fluoroalcohol" of the raw material preparing process (A) are usable.

2. Heating and Refluxing Process

First Embodiment (B) Heating and Refluxing Process

In the heating and refluxing process, the mixture obtained in the raw material preparing process (A) is heated and refluxed to obtain a solution containing a condensate.

Condensate

In the heating and refluxing process, hydrolysis and condensation can be promoted by heating and refluxing the mixture containing the hydrolytic silane compound, obtained in the raw material preparing process (A), in a solvent in which water is present. A condensate having a desired condensation degree can be obtained by controlling the temperature, time, concentration, pH, moisture amount, and the like of the hydrolysis and the condensation as appropriate. The condensate is a reaction condensate of a composition containing the fluorine-containing hydrolytic silane compound and fluoroalcohol.

Herein, the progress degree (condensation degree) of the condensation can be defined as a ratio of the number of condensed functional groups to the number of condensable functional groups. The condensable functional group is equivalent to the hydrolytic substituent in the hydrolytic silane compound. The condensation degree can be estimated by $^{29}$Si-NMR measurement. For example, when using a hydrolytic silane compound having three hydrolytic substituents in one molecule, the peaks originating from the following four Si atoms are separately observed in the $^{29}$Si-NMR measurement. Then, the condensation degree (%) is calculated from the integrated value of the peaks according to the following expression:
T0 body: Si atom not bonded to another hydrolytic silane compound;
T1 body: Si atom bonded to one hydrolytic silane compound through oxygen;
T2 body: Si atom bonded to two hydrolytic silane compounds through oxygen; and
T3 body: Si atom bonded to three hydrolytic silane compounds through oxygen.

$$\text{Condensation degree (\%)} = \frac{(T1 + 2*T2 + 3*T3)*100}{3*(T0 + T1 + T2 + T3)}$$

The condensation degree of the condensate varies depending on the type and the synthesis conditions of the hydrolytic silane compound to be used and is suitably 40% or more and more suitably 50% or more from the viewpoint of compatibility with resin and coatability. The condensation degree is suitably 90% or less and more suitably 70% or less from the viewpoint of preventing deposition, gelling, and the like. More specifically, the condensation degree is suitably 40% or more and 90% or less and more suitably 50% or more and 70% or less. However, it is rare that the condensation degree exceeds 90% in the state of being dissolved in a solution. In the second embodiment described later, the condensation degree of the condensate means the condensation degree of a second condensate.

When the ratio of the unreacted silane compound (T0 body) in the condensate is high, the uniformity of a coating film decreases in some cases. Therefore, the T0 body ratio (Ratio of the number of Si atoms not bonded to another hydrolytic silane compound to the total number of Si atoms) in the condensate is suitably 20% or less and more suitably 0 to 10%. When the silane compound in which all the hydrolytic substituents are condensed (T3 body) increases, the water repellent antifouling properties decrease or a gel is deposited in the solution in some cases. For example, in the silane compound formed into the T3 body in the solution, the degree of freedom of a substituent decreases, so that the silane compound inhibits the surface orientation of the fluorine atoms when forming a coating film or reduces the water repellent antifouling properties in some case. Therefore, the T3 body ratio (Ratio of the number of Si atoms bonded to three hydrolytic silane compounds through an oxygen atom to the total number of Si atoms) in the condensate is suitably 50% or less and more suitably 10 to 30%. In the second embodiment described later, the "T0 body ratio in the condensate" and "T3 body ratio in the condensate" each mean the ratio in the second condensate.

The condensation degree can also be controlled by adjusting the ratio of the fluoroalcohols in all the solvents contained in the solution in the hydrolysis and the condensation. According to this method, the fluoroalcohol volatilizes after the application of the coating material according to the present disclosure, and therefore problems, such as corrosion by a remaining catalyst component, are less likely to arise as compared with a case of using a catalyst, such as metal alkoxide or acid which is difficult to volatilize.

The concentration of the solid content containing the hydrolytic silane compound in the solution containing the condensate obtained in the heating and refluxing process (B) is suitably 1 to 80% by mass from the points of solubility and reaction efficiency. Herein, the concentration of the solid content containing the hydrolytic silane compound means the solid content concentration of the hydrolytic silane compound used in the raw material preparing process. In the second embodiment described later, the condensate means a second condensate.

Second Embodiment

First Heating and Refluxing Process (B-1) and Second Heating and Refluxing Process (B-2)

When performing heating and refluxing in a solution containing fluoroalcohol as with the heating and refluxing process (B) in the first embodiment, the condensation becomes difficult to progress due to the effect of the fluoroalcohol, so that it sometimes require time to obtain a condensate having a desired condensation degree. Therefore, in the second embodiment, as a method for more efficiently obtaining a desired condensate, the heating and refluxing process (B) is carried out while being divided into a first heating and refluxing process (B-1) of obtaining a first condensate and a second heating and refluxing process (B-2) of obtaining a second condensate as illustrated in FIG. 2.

Specifically, in the first heating and refluxing process (B-1), the hydrolytic silane compound is heated and refluxed in a solution not containing fluoroalcohol to obtain a first condensate. Herein, the condensation progresses also in the second heating and refluxing process (B-2), and therefore the condensation degree of a second condensate to be finally obtained can be adjusted by controlling the condensation degree of the first condensate as appropriate. Thereafter, in the second raw material preparing process, fluoroalcohol is added to a solution containing the first condensate to obtain a second mixture.

Next, in the second heating and refluxing process, the second mixture obtained above is heated and refluxed to obtain a second condensate. More specifically, the second heating and refluxing process is a process of heating and refluxing the hydrolytic silane compound in a solution containing fluoroalcohol. Herein, a substitution reaction to a fluoroalkoxy group of the hydrolytic group remaining in the silane condensate can be controlled as appropriate by the temperature, time, and the like in the heating and refluxing. The second condensate is a reaction condensate of a composition containing the fluorine-containing hydrolytic silane compound and fluoroalcohol.

Other items, such as the condensation degree, are equivalent to those in the heating and refluxing process (B), and therefore a description thereof is omitted.

3. Dilution Process

As illustrated in FIG. 1 and FIG. 2, the method for manufacturing a coating material according to the present disclosure may further have the following dilution process:
(C) Dilution process of diluting the solution containing the condensate (Condensate obtained in the process (B) or Second condensate obtained in the process (B-2)) of the hydrolytic silane compound with a diluent solvent.

In the dilution process (C), the solution containing the condensate of the hydrolytic silane compound obtained in the heating and refluxing process (B) or the second heating and refluxing process (B-2) is diluted using a diluent solvent to prepare a dilution solution (coating liquid). The diluent solvent is not particularly limited and ketones, such as fluoroalcohol, methyl ethyl ketone, methyl isobutyl ketone, are usable. Among the above, it is suitable to prepare the coating liquid using fluoroalcohol because a coating material can be smoothly formed as a coating film and the storage stability of the material improves. The fluoroalcohol used as the diluent solvent may be the same as or different from the fluoroalcohol used in the heating and refluxing described above. However, the same one as the fluoroalcohol used in the heating and refluxing is suitably used from the viewpoint of the affinity of solvents.

The concentration of the solid content containing the hydrolytic silane compound in the coating liquid obtained in the dilution process is suitably 0.1 to 30% by mass and more suitably 5 to 10% by mass. By adjusting the solid content concentration within the ranges mentioned above, the concentration unevenness on the water repellent film surface is reduced, and uniform and sufficient water repellency can be obtained on the entire water repellent film surface. Furthermore, the solvent ratio of the fluoroalcohol in the coating liquid increases, and therefore the storage stability further improves. The concentration of the solid content containing the hydrolytic silane compound as used herein means the compounding amount (solid content concentration) of the hydrolytic silane compound used in the raw material preparing process before the heating and refluxing.

EXAMPLES

Examples and Comparative Example are described below but the present invention is not particularly limited thereto. In the following description, Example 3 is replaced by Reference Example 1.

Example 1

Preparation of Coating Liquid of Coating Material

A coating material was prepared based on a manufacturing flow illustrated in FIG. 2.

First, 0.96 g (0.726 mmol) of a compound represented by Formula (10) above (g in Formula (10) is an integer of 3 to 10, which is hereinafter referred to as "compound (i)), 12.53 g (0.045 mol) of γ-glycidoxypropyltriethoxysilane (hereinafter referred to as "GPTES"), 8.02 g (0.045 mol) of methyltriethoxysilane (hereinafter referred to as "MTEOS"), 5.93 g of pure water, and 23.6 g of ethanol were added to a flask having a cooling tube were stirred at room temperature for 5 minutes. Thereafter, the obtained mixture was heated and refluxed for 24 hours to thereby prepare a first condensate (First heating and refluxing process).

Next, the obtained first condensate was added to a flask having a cooling tube, 6.33 g of each of 1H,1H-pentafluoropropanol ($CF_3CF_2CH_2OH$) and 1H,1H-heptafluorobutanol ($F(CF_2)_3CH_2OH$) were added, and then the mixture was stirred for 5 minutes at room temperature. Thereafter, the obtained mixture was heated and refluxed for 5 hours to thereby prepare a second condensate (Second heating and refluxing process).

Finally, a photoacid generator (Trade name: ADEKA OPTOMER SP-172, manufacture by ADEKA) was added so that the solid content ratio to the GPTES was 1% by mass in the dilution process, and then 75.7 g of each of 1H,1H-pentafluoropropanol and 1H,1H-heptafluorobutanol were added to a solution containing the second condensate obtained in the second heating and refluxing process for dilution to thereby give a coating liquid of a coating material 1.

Production of Coating Film

Next, a coating film was produced by a method described below.

The obtained coating liquid of the coating material 1 was applied to a substrate by a spin coating method so that the film thickness was 500 nm, and then heat-treated at 90° C. for 5 minutes to form a coating film.

Next, the coating film on the substrate was exposed by an exposure device UX3000 (Trade name, manufactured by USHIO, INC.), and then heat-treated at 90° C. for 4 minutes. Then, the resultant substance was subjected to washing treatment using a mixed liquid of methylisobutylketone and xylene, and then subjected to rinse treatment with isopropanol. Furthermore, the resultant substance was further heated at 200° C. for 1 hour to cure the coating film to thereby give a coating film 1.

Examples 2 to 13

The type and the compounding ratio of the silane compound, the solvent in each heating and refluxing process, the content of the fluoroalcohol in all the solvents of each solution (% by mass), the solid content concentration (% by mass) of the silane compound in each solution, the diluent solvent, and the solid content concentration (% by mass) of the silane compound in the coating liquid after dilution each were changed as shown in Tables 1 and 2. A coating liquid of a coating material was prepared, and then a coating film was produced in the same manner as in Example 1, except the changes above. In Example 3, a coating liquid of a coating material was prepared according to a manufacturing flow illustrated in FIG. 1 without dividing the heating and refluxing process into two processes. In Example 11, no dilution process was carried out.

Comparative Example 1

The type and the compounding ratio of the silane compound, the solvent in each heating and refluxing process, the content of the fluoroalcohol in all the solvents of each solution (% by mass), the solid content concentration (% by mass) of the silane compound in each solution, the diluent solvent, and the solid content concentration (% by mass) of the silane compound in the coating liquid after dilution each were changed as shown in Tables 1 and 2. A coating liquid of a coating material was prepared, and then a coating film was produced in the same manner as in Example 1, except the changes above.

The following measurement and evaluation were performed for the obtained coating materials and coating films according to Examples and Comparative Example.
Measurement and Evaluation
Condensation Degree Each coating material was measured for the condensation degrees (%) of the first condensate and the second condensate. Specifically, $^{29}Si$-NMR measurement was performed using a nuclear magnetic resonance apparatus (Trade name: AVANCEII 500 MHz, manufactured by Bruker BioSpin), and then the condensation degree was calculated from the above-described definition. The results are shown in Tables 1 and 2. For Example 3, the condensation degree of the first condensate was measured.
Fluoroalcohol Reduction Amount In order to confirm the substitution to a fluoroalkoxy group of a hydrolytic group remaining in the prepared condensate, the fluoroalcohol reduction amount in the first and second heating and refluxing processes were analyzed as follows.

First, the relative mass ratio of water and the fluoroalcohol was measured in the raw material preparation and after the second heating and refluxing process using a gas chromatography-mass spectrometer (GC/MS, Trade name: Shimadzu QP-5050A, Column: DB-WAXETR 0.32 mm×30 m). Then, the moisture amount in the solution after the second heating and refluxing process was measured with a Karl Fischer moisture meter (Trade name: MKC-510N, manufactured by Kyoto Electronics Manufacturing Co., Ltd.). From the obtained results, the fluoroalcohol reduction amounts (% by mass) in the first and second heating and refluxing processes were calculated. The results are shown in Table 3. For Example 3, the measurement was performed in the raw material preparation and after the first heating and refluxing process.

Water Repellency

In order to evaluate the water repellency of the produced coating film, the dynamic receding contact angle θr (°) to pure water was measured using a micro contact angle meter (Product name: DropMeasure, manufactured by Microjet Corporation). The results are shown in Table 3 as the "Early stage" dynamic receding contact angle.

Storage Stability

As the evaluation of storage stability, a sample immediately after the coating liquid preparation and a sample after three month storage in a normal temperature and normal humidity environment of the coating material according to each of Examples and Comparative Example were measured for the condensation degree and the dynamic receding contact angle to pure water in the same manner as above. The normal temperature in the present disclosure refers to a temperature state within the range of 20° C.±15° C., i.e., within the range of 5° C. or more and 35° C. or less, and the normal humidity refers to a humidity state within the range where the relative humidity is 45 to 85% as specified in Japanese Industrial Standards (JIS Z 8703). Then, the water repellency changes due to the storage (Difference between θr after the three month storage and θr in the early stage). The evaluation criteria of the storage stability are as follows. The results are shown in Table 3.

A: The θr difference is less than 5°.
B: The θr difference is 5 to 9°.
C: The θr difference is 10° or more.

Appearance

The appearance of the coating film was observed using an optical microscope (Trade name: Axio Lab.A1, manufactured by Carl Zeiss) to evaluate the presence or absence of streak unevenness. The results are shown in Table 3. The streak unevenness was observed in Examples 11 to 13 but did not pose any problem in terms of appearance.

TABLE 1

| | First heating and refluxing process | | | | | | | | |
|---|---|---|---|---|---|---|---|---|---|
| | Silane compound | | | Solvent | | | Fluoroalcohol | Silane compound | |
| | Fluorine-containing silane compound | Another silane compound | Compounding ratio (Molar ratio) | Fluoroalcohol | | Another solvent | content in all solvents (% by mass) | concentration in solution (% by mass)*1 | Condensation degree (%) |
| | (A) | (B) | (C) | (A)/(B)/(C) | (D) | (E) | (F) | | |
| Ex. 1 | (i) | GPTES | MTEOS | 0.8/49.6/49.6 | — | Ethanol | Water | 0 | 42 | 55 |
| Ex. 2 | (i) | GPTES | MTEOS | 0.8/49.6/49.6 | — | Ethanol | Water | 0 | 42 | 55 |
| Ex. 3 | (i) | GPTES | MTEOS | 0.8/49.6/49.6 | $CF_3CF_2CH_2OH$ | Ethanol | Water | 50 | 21 | 47 |
| Ex. 4 | (ii) | GPTES | MTEOS | 0.8/49.6/49.6 | — | Ethanol | Water | 0 | 42 | 55 |
| Ex. 5 | (iii) | GPTES | MTEOS | 0.8/49.6/49.6 | — | Ethanol | Water | 0 | 42 | 55 |
| Ex. 6 | (i) | — | — | 100/0/0 | — | Ethanol | Water | 0 | 42 | 40 |
| Ex. 7 | (i) | GPTES | MTEOS | 0.8/49.6/49.6 | — | Ethanol | Water | 0 | 42 | 55 |
| Ex. 8 | (i) | GPTES | MTEOS | 0.8/49.6/49.6 | — | Ethanol | Water | 0 | 42 | 55 |
| Ex. 9 | (i) | GPTES | MTEOS | 0.8/49.6/49.6 | — | Ethanol | Water | 0 | 59 | 65 |
| Ex. 10 | (i) | GPTES | MTEOS | 0.8/49.6/49.6 | — | Ethanol | Water | 0 | 42 | 55 |
| Ex. 11 | (i) | GPTES | MTEOS | 0.8/49.6/49.6 | — | Ethanol | Water | 0 | 42 | 55 |
| Ex. 12 | (i) | GPTES | MTEOS | 0.8/49.6/49.6 | — | Ethanol | Water | 0 | 42 | 55 |
| Ex. 13 | (i) | GPTES | MTEOS | 0.8/49.6/49.6 | — | Ethanol | Water | 0 | 42 | 55 |
| Comp. Ex. 1 | (i) | GPTES | MTEOS | 0.8/49.6/49.6 | — | Ethanol | Water | 0 | 42 | 55 |

The abbreviations in Table 1 represent the following compounds:

(i): Compound represented by Formula (10);

(ii): Tridecafluoro-1,1,2,2-tetrahydrooctyltriethoxysilane;

(iii): Perfluorodecylethyltriethoxysilane;

GPTES: γ-glycidoxypropyltriethoxysilane; and

MTEOS: Methyltriethoxysilane.

The silane compound concentrations (% by mass) in the solution in the first heating and refluxing process is calculated from the following expressions:

*1Silane compound concentration in solution = (Total mass of silane compounds (Total of (A) to (C))/Total mass of solutions (Total of (A) to (F)) in First heating and refluxing process) × 100.

TABLE 2

| | Second heating and refluxing process | | | | | Dilution process | | |
|---|---|---|---|---|---|---|---|---|
| | Fluoroalcohol | | Fluoroalcohol content in all solvents (% by mass) | Silane compound concentration in solution (% by mass)*2 | Condensation degree (%) | Diluent solvent | | Silane compound concentration in solution (% by mass)*3 |
| | (G) | (H) | | | | (I) | (J) | |
| Ex. 1 | $CF_3CF_2CH_2OH$ | $F(CF_2)_3CH_2OH$ | 30 | 34 | 60 | $CF_3CF_2CH_2OH$ | $F(CF_2)_3CH_2OH$ | 10 |
| Ex. 2 | $CF_3CF_2CH_2OH$ | — | 30 | 34 | 60 | $CF_3CF_2CH_2OH$ | — | 10 |
| Ex. 3 | — | — | — | — | — | $CF_3CF_2CH_2OH$ | — | 10 |
| Ex. 4 | $CF_3CF_2CH_2OH$ | — | 30 | 34 | 60 | $CF_3CF_2CH_2OH$ | — | 10 |
| Ex. 5 | $CF_3CF_2CH_2OH$ | — | 30 | 34 | 60 | $CF_3CF_2CH_2OH$ | — | 10 |
| Ex. 6 | $CF_3CF_2CH_2OH$ | — | 30 | 34 | 55 | $CF_3CF_2CH_2OH$ | — | 10 |
| Ex. 7 | $CF_3OH$ | — | 30 | 34 | 60 | $CF_3OH$ | — | 10 |
| Ex. 8 | $F(CF_2)_6(CH_2)_6OH$ | — | 30 | 34 | 55 | $F(CF_2)_6(CH_2)_6OH$ | — | 10 |
| Ex. 9 | $CF_3CF_2CH_2OH$ | — | 30 | 50 | 68 | $CF_3CF_2CH_2OH$ | — | 10 |
| Ex. 10 | $CF_3CF_2CH_2OH$ | — | 10 | 23 | 68 | $CF_3CF_2CH_2OH$ | — | 10 |
| Ex. 11 | $CF_3CF_2CH_2OH$ | — | 30 | 34 | 60 | — | — | — |
| Ex. 12 | $CF_3CF_2CH_2OH$ | — | 30 | 34 | 60 | $CH_3COCH_2CH(CH_3)_2$ | — | 10 |
| Ex. 13 | $CF_3CF_2CH_2OH$ | — | 30 | 34 | 60 | $CF_3CF_2CH_2OH$ | — | 30 |
| Comp. Ex. 1 | — | — | — | — | — | — | — | — |

In Table 2, the silane compound concentrations (% by mass) in the solution in the second heating and refluxing process and the dilution process are calculated from the following expressions:
*2Silane compound concentration in solution = (Total mass of silane compounds in raw material preparation process (Total of (A) to (C))/Total mass of solutions (Total of (A) to (H)) in Second heating and refluxing process) × 100; and
*3Silane compound concentration in solution = (Total mass of silane compounds in raw material preparation process (Total of (A) to (C))/Total mass of solutions (Total of (A) to (J)) in dilution process) × 100.

TABLE 3

| | Evaluation | | | | | | |
|---|---|---|---|---|---|---|---|
| | Condensation degree (%) | | Fluoroalcohol reduction amount in first and second heating and refluxing processes (% by mass) | Dynamic receding contact angle $\theta r$ (°) | | Storage stability (Water repellency changes) | Appearance Streak unevenness |
| | Early stage | After three month storage | | Early stage | After three month storage | | |
| Ex. 1 | 60 | 61 | 30 | 95 | 95 | A | No streak unevenness |
| Ex. 2 | 60 | 62 | 30 | 95 | 94 | A | No streak unevenness |
| Ex. 3 | 47 | 49 | 30 | 88 | 86 | A | No streak unevenness |
| Ex. 4 | 60 | 62 | 30 | 95 | 94 | A | No streak unevenness |
| Ex. 5 | 60 | 62 | 30 | 85 | 84 | A | No streak unevenness |
| Ex. 6 | 55 | 57 | 30 | 88 | 86 | A | No streak unevenness |
| Ex. 7 | 60 | 65 | 30 | 95 | 90 | B | No streak unevenness |
| Ex. 8 | 55 | 60 | 15 | 88 | 83 | B | No streak unevenness |
| Ex. 9 | 68 | 73 | 10 | 90 | 85 | B | No streak unevenness |
| Ex. 10 | 68 | 73 | 33 | 90 | 85 | B | No streak unevenness |
| Ex. 11 | 60 | 65 | 30 | 88 | 83 | B | Presence of streak unevenness |
| Ex. 12 | 60 | 65 | 10 | 95 | 93 | A | Presence of streak unevenness |
| Ex. 13 | 60 | 61 | 30 | 92 | 90 | A | Presence of streak unevenness |
| Comp. Ex. 1 | 55 | 70 | — | 95 | 80 | C | No streak unevenness |

As shown in Table 3, the appearance of the coating films according to Examples was smooth and the early water repellency was also good. The changes in the condensation degree and the dynamic receding contact angle after three-month storage were also small, and the storage stability was excellent.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-206131 filed Oct. 20, 2016, which is hereby incorporated by reference herein in its entirety.

What is claimed is:

1. A method for manufacturing a coating material containing a condensate of a hydrolytic silane compound, the method comprising:
a step of obtaining a condensate of a fluorine-containing hydrolytic silane compound; and
a step of causing the condensate to react with fluoroalcohol,
wherein a condensation degree of the condensate is 40% or more.

2. The method for manufacturing a coating material according to claim 1, wherein the fluoroalcohol contains two or more kinds of fluoroalcohols.

3. The method for manufacturing a coating material according to claim 1, wherein
the step of obtaining the condensate includes:
a step of mixing the fluorine-containing hydrolytic silane compound and a solvent; and
a step of heating a mixture obtained in the mixing step to obtain a solution containing the condensate, and
the step of causing the condensate to react with fluoroalcohol includes:
a step of adding the fluoroalcohol to the solution containing the condensate; and
a step of heating a mixture obtained in the step of adding the fluoroalcohol.

4. The method for manufacturing a coating material according to claim 3, wherein the solvent used in the mixing step does not contain fluoroalcohol.

5. The method for manufacturing a coating material according to claim 3, wherein both the step of obtaining the solution containing the condensate and the step of heating the mixture obtained in the step of adding the fluoroalcohol are performed by heating and refluxing.

6. The method for manufacturing a coating material according to claim 1, wherein the fluorine-containing hydrolytic silane compound is a compound having a fluorine-containing group selected from the group consisting of a perfluoroalkyl group, a perfluoroaryl group, and a perfluoropolyether group.

7. The method for manufacturing a coating material according to claim 1, wherein the fluorine-containing hydrolytic silane compound is a compound represented by Formula (1):

wherein, in Formula (1), $R_f$ represents an alkyl group having one or more fluorine atoms or an aryl group having one or more fluorine atoms, R represents a non-hydrolytic substituent, X represents a hydrolytic substituent, a is 1 or 2, b is an integer of 0 to 2, and a+b is an integer of 1 to 3.

8. The method for manufacturing a coating material according to claim 1, wherein the fluorine-containing hydrolytic silane compound is at least one of compounds represented by Formulae (3) to (6):

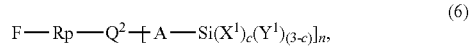

wherein, in Formulae (3) to (6), Rp represents a perfluoropolyether group, A and $A^1$ each independently represent an organic group having 1 to 12 carbon atoms, $X^1$ represents a hydrolytic substituent, $Y^1$ and $R^1$ each independently represent a non-hydrolytic substituent, $Z^1$ represents a hydrogen atom or an alkyl group, $Q^1$ represents a divalent linking group, c is an integer of 1 to 3, m is an integer of 1 to 4, n is 1 or 2, and $Q^2$ represents a divalent linking group in a case of n=1 and represents a trivalent linking group in a case of n=2.

9. The method for manufacturing a coating material according to claim 8, wherein the perfluoropolyether group represented by Rp in Formulae (3) to (6) above is represented by Formula (2):

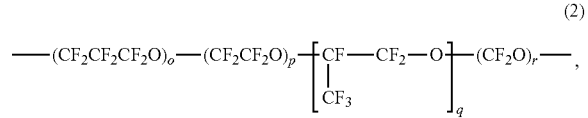

wherein, in Formula (2), o, p, q, and r each independently represent an integer of 0 to 30 and at least one of o, p, q, and r is an integer of 2 or more.

10. The method for manufacturing a coating material according to claim 1, wherein a condensate of the fluorine-containing hydrolytic silane compound and a photosensitive group-containing hydrolytic silane compound is obtained in the step of obtaining the condensate.

11. The method for manufacturing a coating material according to claim 10, wherein the photosensitive group-containing hydrolytic silane compound is a compound having an epoxy group represented by Formula (12):

wherein, in Formula (12), $R_C$ represents a non-hydrolytic substituent having an epoxy group, $R^2$ represents a non-hydrolytic substituent, $X^2$ represents a hydrolytic substituent, and d is an integer of 0 to 2.

12. The method for manufacturing a coating material according to claim 1, wherein the fluoroalcohol is at least one of compounds represented by Formulae (14) to (16):

wherein, in formulae (14) to (16), $R_{f1}$ represents a fluoroalkyl group or a perfluoroaryl group having 3 or more fluorine atoms, $R^3$ represents a non-hydrolytic substituent, j is 1 or 2, k is an integer of 0 to 2, l is 1 or 2, and j+k is an integer of 1 to 3.

13. The method for manufacturing a coating material according to claim 1, further comprising:
    a dilution step of diluting the obtained solution with a diluent solvent after the step of causing the condensate to react with fluoroalcohol.

14. The method for manufacturing a coating material according to claim 13, wherein the diluent solvent is a same fluoroalcohol as the fluoroalcohol used in the heating.

15. The method for manufacturing a coating material according to claim 13, wherein a concentration of a solid content containing the hydrolytic silane compound before the heating in the solution obtained in the dilution step is 0.1 to 30% by mass.

16. A method for manufacturing a coating material containing a condensate of a hydrolytic silane compound, the method comprising:
    a step of obtaining a condensate of a fluorine-containing hydrolytic silane compound; and
    a step of causing the condensate to react with fluoroalcohol,
    wherein the step of obtaining the condensate includes:
    a step of mixing the fluorine-containing hydrolytic silane compound and a solvent; and
    a step of heating a mixture obtained in the mixing step to obtain a solution containing the condensate, and
    wherein the step of causing the condensate to react with fluoroalcohol includes:
    a step of adding the fluoroalcohol to the solution containing the condensate; and
    a step of heating a mixture obtained in the step of adding the fluoroalcohol.

17. A method for manufacturing a coating material containing a condensate of a hydrolytic silane compound, the method comprising:
    a step of obtaining a condensate of a fluorine-containing hydrolytic silane compound; and
    a step of causing the condensate to react with fluoroalcohol,
    wherein the fluorine-containing hydrolytic silane compound is at least one of compounds represented by Formulae (3) to (6):

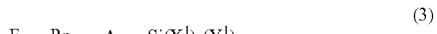
(3)

(4)

(5)

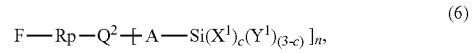
(6)

wherein, in Formulae (3) to (6), Rp represents a perfluoropolyether group, A and $A^1$ each independently represent an organic group having 1 to 12 carbon atoms, $X^1$ represents a hydrolytic substituent, $Y^1$ and $R^1$ each independently represent a non-hydrolytic substituent, $Z^1$ represents a hydrogen atom or an alkyl group, $Q^1$ represents a divalent linking group, c is an integer of 1 to 3, m is an integer of 1 to 4, n is 1 or 2, and $Q^2$ represents a divalent linking group in a case of n=1 and represents a trivalent linking group in a case of n=2.

* * * * *